(12) United States Patent
Yamazaki et al.

(10) Patent No.: US 12,330,463 B2
(45) Date of Patent: Jun. 17, 2025

(54) VEHICLE SUSPENSION SYSTEM

(71) Applicant: HONDA MOTOR CO., LTD., Tokyo (JP)

(72) Inventors: Ryosuke Yamazaki, Saitama (JP); Kazuya Konada, Saitama (JP); Takashi Yanagi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 18/173,075

(22) Filed: Feb. 23, 2023

(65) Prior Publication Data
US 2023/0286346 A1 Sep. 14, 2023

(30) Foreign Application Priority Data
Mar. 14, 2022 (CN) .......................... 202210248069.0

(51) Int. Cl.
*B60G 17/0165* (2006.01)
*B60G 17/018* (2006.01)
*B60G 17/019* (2006.01)

(52) U.S. Cl.
CPC ....... *B60G 17/0165* (2013.01); *B60G 17/018* (2013.01); *B60G 17/019* (2013.01); *B60G 2400/82* (2013.01); *B60G 2500/10* (2013.01); *B60G 2600/182* (2013.01)

(58) Field of Classification Search
CPC ............. B60G 17/0165; B60G 17/018; B60G 17/019; B60G 2400/82; B60G 2400/821; B60G 2500/10; B60G 2600/182
See application file for complete search history.

(56) References Cited

U.S. PATENT DOCUMENTS

| 7,722,056 B2 * | 5/2010 | Inoue ..................... B60G 17/06 280/6.154 |
| 2023/0294474 A1 * | 9/2023 | Matsuura ........... B60G 17/0152 701/37 |

FOREIGN PATENT DOCUMENTS

| EP | 0393225 A1 * | 10/1990 | .......... B60G 17/019 |
| JP | H09142127 A | 6/1997 | |
| WO | WO-2022024919 A1 * | 2/2022 | ......... B60G 17/0152 |

* cited by examiner

*Primary Examiner* — Mark L. Greene
(74) *Attorney, Agent, or Firm* — CKC & Partners Co., LLC

(57) ABSTRACT

A vehicle suspension system includes: a road surface sensor provided in a vehicle body portion ahead of a front wheel to detect an unevenness of a road surface; an electromagnetic damper that applies a damping force and a propulsive force along a stroke direction to a vehicle body and the front wheel with the aid of a motor element; and an ECU. The road surface sensor includes: a first road surface sensor; and a second road surface sensor that overlaps the first road surface sensor in a vehicle width direction and is provided at a position behind the first road surface sensor. The ECU includes: a road surface height calculation unit that calculates a road surface height based on detection values from the road surface sensors and a movement amount of the vehicle; and a damper control unit that controls the motor element based on the calculated road surface height.

2 Claims, 13 Drawing Sheets

WHEN TRAVELING AT CONSTANT SPEED
(WITHOUT ACCELERATION/DECELERATION AND TURNING)

WHEN TRAVELING AT CONSTANT SPEED
(WITHOUT ACCELERATION/DECELERATION AND TURNING)

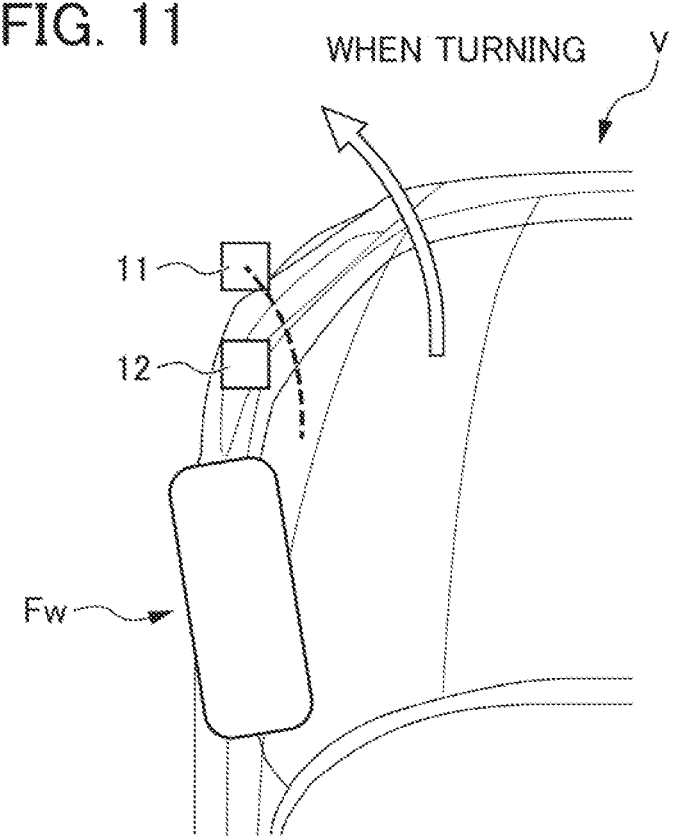

FIG. 12 WHEN TRAVELING STRAIGHT AHEAD
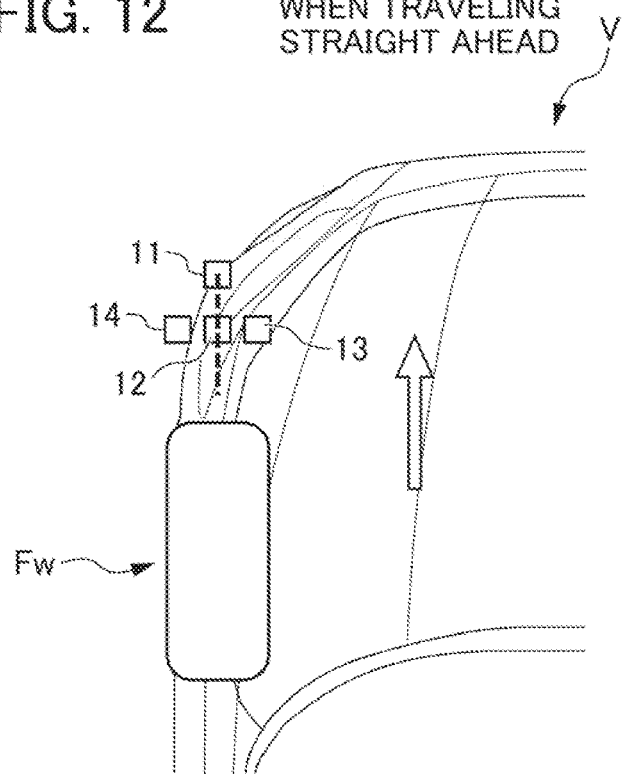
FIG. 13 WHEN TURNING
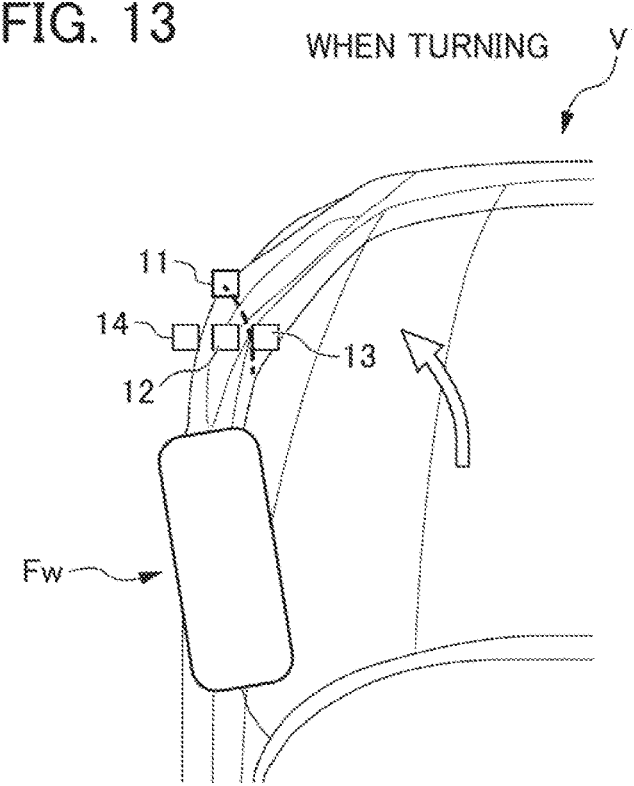

VEHICLE SUSPENSION SYSTEM

This application is based on and claims the benefit of priority from Chinese Patent Application No. CN202210248069.0, filed on 14 Mar. 2022, the content of which is incorporated herein by reference.

BACKGROUND OF THE INVENTION

Field of the Invention

The present invention relates to a vehicle suspension system.

Related Art

Conventionally, a vehicle suspension system is known which detects an unevenness of a road surface using a road surface sensor that is attached beneath a front end of a vehicle body and directed downward the front of a vehicle and controls a damper based on the detection result (for example, see Japanese Unexamined Patent Application, Publication No. H9-142127).

Patent Document 1: Japanese Unexamined Patent Application, Publication No. H9-142127

SUMMARY OF THE INVENTION

However, in the suspension system of Japanese Unexamined Patent Application, Publication No. H9-142127, an unevenness of the road surface is detected by one road surface sensor. Therefore, when the vehicle body vibrates, for example, during deceleration or when running over an unevenness of the road surface, the vibration of the vehicle body affects the detection value from the road surface sensor. Thus, it is difficult to detect an unevenness of the road surface accurately and precisely. Therefore, it is difficult to appropriately control the damper according to an unevenness of the road surface.

The present invention has been made to address the above situation, and an object of the present invention is to provide a vehicle suspension system capable of accurately and precisely detecting an unevenness of the road surface and appropriately controlling a damper according to the unevenness of the road surface.

(1) A suspension system (for example, a suspension system 1 described later) of a vehicle (for example, a vehicle V described later) according to the present invention includes: a road surface sensor provided in a vehicle body portion ahead of a front wheel (for example, a front wheel $F_w$ described later) to detect an unevenness (for example, a bump S described later) of a road surface (for example, a road surface R described later); a damper (for example, an electromagnetic damper 2 described later) provided between a vehicle body (for example, a vehicle body B described later), which is a sprung member of a vehicle, and a wheel, which is an unsprung member, to apply a damping force and a propulsive force along a stroke direction to the vehicle body and the wheel with the aid of an actuator (for example, a motor element 23 described later); and a control device (for example, an ECU 3 described later) that controls the actuator based on a detection value from the road surface sensor. The road surface sensor includes: a front road surface sensor (for example, a first road surface sensor 11); and a rear road surface sensor (for example, a second road surface sensor 12) that overlaps the front road surface sensor in a vehicle width direction and is provided at a position behind the front road surface sensor, and the control device includes: a vehicle movement amount acquisitioner (for example, a vehicle movement amount acquisition unit 33 described later) that acquires a movement amount of the vehicle; a road surface height calculator (for example, a road surface height calculation unit 34 described later) that calculates a road surface height based on a detection value from the road surface sensor and the movement amount of the vehicle acquired by the vehicle movement amount acquisitioner; and a damper controller (for example, a damper control unit 35 described later) that controls the actuator based on the road surface height calculated by the road surface height calculator.

According to the invention of (1), by calculating the road surface height based on the detection value from the front road surface sensor, the detection value from the rear road surface sensor, and the movement amount of the vehicle, it is possible to accurately and precisely calculate the road surface height by subtracting the vibration of the vehicle body included in the detection values from the road surface sensors. In addition, since the actuator of the damper can be controlled based on the road surface height calculated accurately and precisely, the ride comfort of the vehicle can be further improved.

(2) In the vehicle suspension system of (1), at least one selected from the front road surface sensor and the rear road surface sensor may include: a central road surface sensor that overlaps the other road surface sensor in the vehicle width direction; an inner road surface sensor provided on an inner side of the central road surface sensor in the vehicle width direction; and an outer road surface sensor provided on an outer side of the central road surface sensor in the vehicle width direction.

According to the invention of (2), at least one selected from the front road surface sensor and the rear road surface sensor includes the central road surface sensor, the inner road surface sensor, and the outer road surface sensor that are arranged side by side in the vehicle width direction. Thus, the front road surface sensor and the rear road surface sensor can easily detect an unevenness of the same road surface, for example, even when the vehicle turns. As a result, the road surface height can be calculated accurately and precisely.

(3) In the vehicle suspension system of (1) or (2), the rear road surface sensor may include: a rear center road surface sensor (for example, a second road surface sensor 12 described later) that overlaps the front road surface sensor in the vehicle width direction; a rear inner road surface sensor (for example, a third road surface sensor 13 described later) provided on an inner side of the rear center road surface sensor in the vehicle width direction; and a rear outer road surface sensor (for example, a fourth road surface sensor 14 described later) provided on an outer side of the rear center road surface sensor in the vehicle width direction, and the road surface height calculator may uses detection values from the plurality of rear road surface sensors to calculate a road surface height at a position where the front road surface sensor passes between the plurality of rear road surface sensors by interpolation.

According to the invention of (3), the rear road surface sensor includes the rear center road surface sensor, the rear inner road surface sensor, and the rear outer road surface sensor that are arranged side by side in the vehicle width direction. Thus, for example, even when the vehicle turns, using the detection values from the plurality of rear road surface sensors, it is possible to calculate the road surface height at the position where the front road surface sensor passes between the plurality of rear road surface sensors by interpolation, so that the road surface height can be calculated accurately and precisely.

According to the present invention, it is possible to provide a vehicle suspension system capable of accurately and precisely detecting an unevenness of the road surface and appropriately controlling a damper according to the unevenness of the road surface.

BRIEF DESCRIPTION OF THE DRAWINGS

FIG. 11 is a plan view of the vehicle according to the embodiment during turning;

FIG. 12 is a plan view of a vehicle according to a modification of the embodiment when traveling straight ahead;

FIG. 13 is a plan view of a vehicle according to a modification of the embodiment during turning;

DETAILED DESCRIPTION OF THE INVENTION

Hereinafter, an embodiment of the present invention will be described in detail with reference to the drawings.

Figure 1:
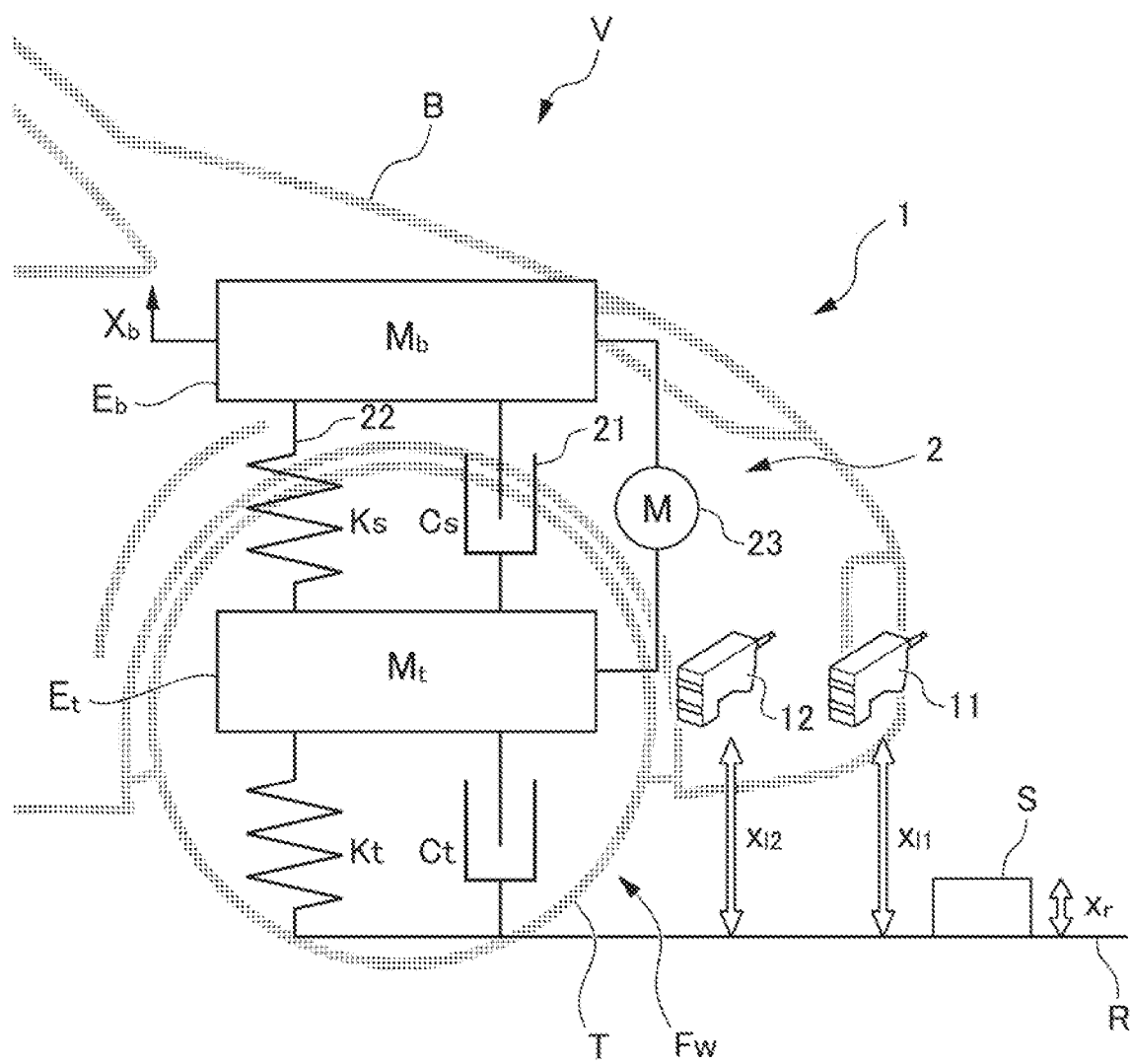
FIG. 1 is a diagram showing a vehicle suspension system according to an embodiment of the present invention.

FIG. 1 is a diagram showing a vehicle suspension system 1 according to an embodiment of the present invention. A vehicle V is, for example, a four-wheeled vehicle having four wheels, and one suspension system 1 is provided for each wheel. Only one of the four suspension systems 1 is shown in FIG. 1.

The suspension system 1 includes a first road surface sensor 11, a second road surface sensor 12, an electromagnetic damper 2, an electronic control unit 3 (hereinafter abbreviated as "ECU (Electronic Control Unit) 3") as a control device.

The first road surface sensor 11 is provided on a vehicle body portion ahead of a front wheel $F_w$, and detects an unevenness (for example, a bump S in FIG. 1) of a road surface R. This first road surface sensor 11 functions as a front road surface sensor. A detection signal from the first road surface sensor 11 is transmitted to a front road surface sensor value acquisition unit 31, which will be described later.

Similar to the first road surface sensor 11, the second road surface sensor 12, is provided on the vehicle body portion ahead of the front wheel $F_w$ and detects an unevenness of the road surface R. The second road surface sensor 12 overlaps the first road surface sensor 11 in the vehicle width direction and is provided at a position behind the first road surface sensor 11. That is, the second road surface sensor 12 functions as a rear road surface sensor and detects an unevenness of the road surface R at the same location as the first road surface sensor 11 when the vehicle V is traveling straight ahead. A detection signal from the second road surface sensor 12 is transmitted to a rear road surface sensor value acquisition unit 32, which will be described later.

Conventionally known road surface sensors are used as the first road surface sensor 11 and the second road surface sensor 12. For example, a visual sensor such as a camera or the like can be used in addition to a laser distance measuring sensor such as an infrared laser.

The electromagnetic damper 2 is provided between a vehicle body B, which is a sprung member of the vehicle V, and the front wheel $F_w$, which is an unsprung member, and is connected to the vehicle body B and the front wheel $F_w$. The electromagnetic damper 2 has a damper element 21, a spring element 22 and a motor element 23.

FIG. 1 also shows a mechanical model of the electromagnetic damper 2. As shown in FIG. 1, the vehicle body B constitutes a sprung member $E_b$ with a sprung mass $M_b$. The front wheel $F_w$ constitutes an unsprung member $E_t$ with an unsprung mass $M_t$. The front wheel $F_w$ has a wheel (not shown) and an elastic tire T represented by a spring coefficient Kt and a viscous damping coefficient Ct.

The damper element 21 is a damper represented by a viscous damping coefficient Cs. The spring element 22 is a spring represented by a spring coefficient Ks. The motor element 23 as an actuator is rotationally driven by an inverter (not shown) and power supplied from a battery (not shown). The motor element 23 is driven and controlled by a damper control unit 35 of the ECU 3, which will be described later. The electromagnetic damper 2 having these elements applies a damping force and a propulsive force along a stroke direction to the vehicle body B and the front wheel $F_w$.

The ECU 3 controls the motor element 23 of the electromagnetic damper 2 based on the detection value from the first road surface sensor 11 and the detection value from the second road surface sensor 12.

Figure 2:
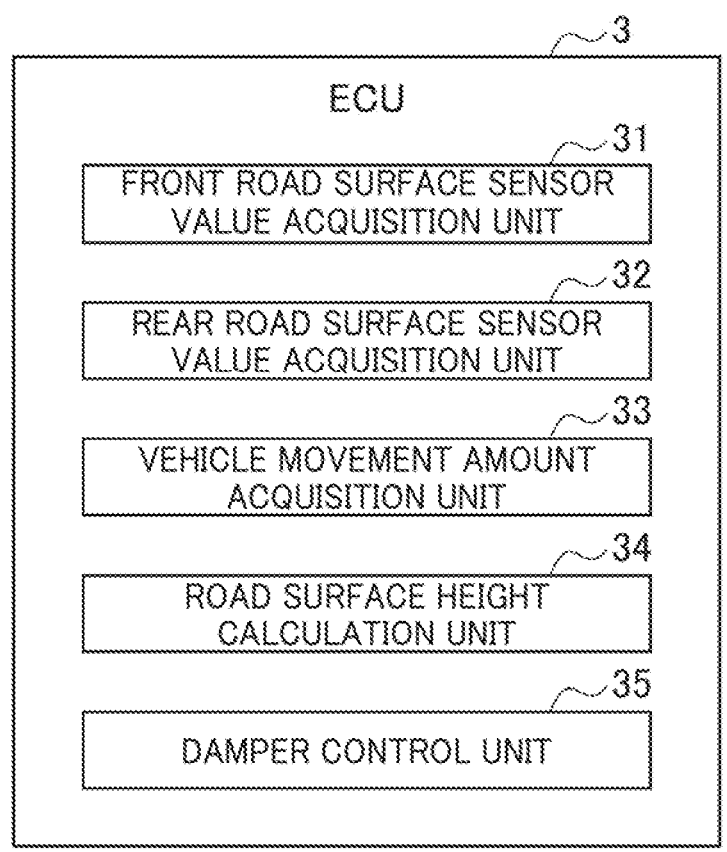
FIG. 2 is a functional block diagram of an ECU included in the vehicle suspension system according to the embodiment.

FIG. 2 is a functional block diagram of the ECU 3 included in the suspension system 1 of the vehicle V according to the present embodiment. As shown in FIG. 2, the ECU 3 of the present embodiment includes a front road surface sensor value acquisition unit 31, a rear road surface sensor value acquisition unit 32, a vehicle movement amount acquisition unit 33, a road surface height calculation unit 34, and a damper control unit 35.

The ECU 3 is an in-vehicle computer including a CPU, a ROM, a RAM, a data bus, an input/output interface, and the like. The ECU 3 executes various types of arithmetic processing in the CPU according to programs stored in the ROM.

The front road surface sensor value acquisition unit 31 acquires the detection value from the first road surface sensor 11, which is the front road surface sensor. The acquired detection value from the first road surface sensor 11 is used for calculation of the road surface height by the road surface height calculation unit 34, which will be described later.

The rear road surface sensor value acquisition unit 32 acquires the detection value from the second road surface sensor 12, which is the rear road surface sensor. The acquired detection value from the second road surface sensor 12 is used for calculation of the road surface height by the road surface height calculation unit 34, which will be described later.

The vehicle movement amount acquisition unit 33 acquires the movement amount of the vehicle V. Specifically, the vehicle movement amount acquisition unit 33 calculates and acquires the movement amount of the vehicle V in the traveling direction based on the vehicle speed detected by a vehicle speed sensor (not shown) mounted on the vehicle V, for example. Further, for example, the vehicle movement amount acquisition unit 33 calculates and acquires the movement amount of the vehicle V in the traveling direction based on the position information of the vehicle V detected by a GPS (not shown) mounted on the vehicle V. Alternatively, for example, the vehicle movement amount acquisition unit 33 calculates and acquires the movement amount of the vehicle V in the traveling direction based on image information acquired by an image sensor such as a camera (not shown) mounted on the vehicle V. The acquired movement amount of the vehicle V is used for calculation of the road surface height by the road surface height calculation unit 34, which will be described later.

The road surface height calculation unit 34 calculates the road surface height based on the detection values from the road surface sensors and the movement amount of the vehicle V described above. Specifically, the road surface height calculation unit 34 calculates the road surface height based on the detection value from the first road surface sensor 11 acquired by the front road surface sensor value acquisition unit 31, the detection value from the second road surface sensor 12 acquired by the rear road surface sensor value acquisition unit 32, and the movement amount of the vehicle V acquired by the vehicle movement amount acquisition unit 33. Calculation of the road surface height by the road surface height calculation unit 34 will be described in detail later.

The damper control unit 35 controls the motor element 23 of the electromagnetic damper 2 based on the road surface height calculated by the road surface height calculation unit 34 described above. Specifically, the damper control unit 35 controls the motor element 23 based on the calculated road surface height so that a damping force and a propulsive force are applied along the stroke direction to the vehicle body B and the front wheel $F_w$ so as to suppress the vibration of the vehicle body B.

Figure 18:
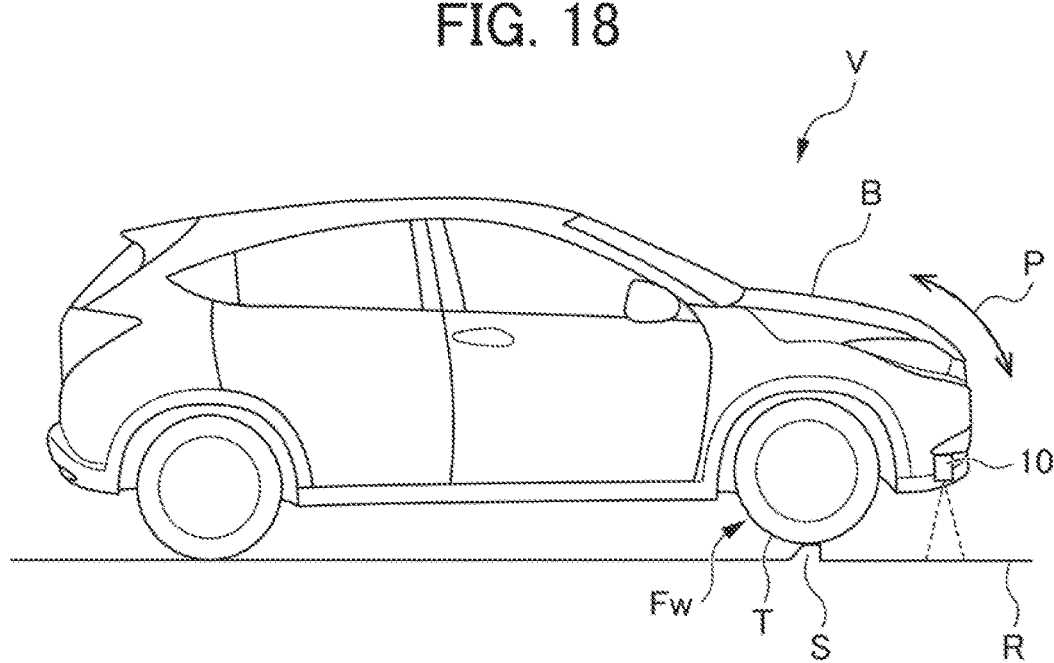
FIG. 18 is a diagram showing a state where a front wheel of a vehicle climbs over a bump.

Next, calculation of the road surface height by the road surface height calculation unit 34 will be described in detail. First, conventional road surface height measurement will be described with reference to FIGS. 18 and 19. Here, FIG. 18 is a diagram showing a state when the front wheel $F_w$ of the vehicle V climbs over the bump S on the road surface R. As shown in FIG. 18, when the front wheel $F_w$ of the vehicle V climbs over the bump S, pitching P, which is a rotational movement about the right and left sides of the vehicle body B, occurs in the vehicle body B, which is a sprung member, as indicated by an arrow in FIG. 18. This pitching P similarly occurs when the vehicle V accelerates or decelerates.

Figure 19:
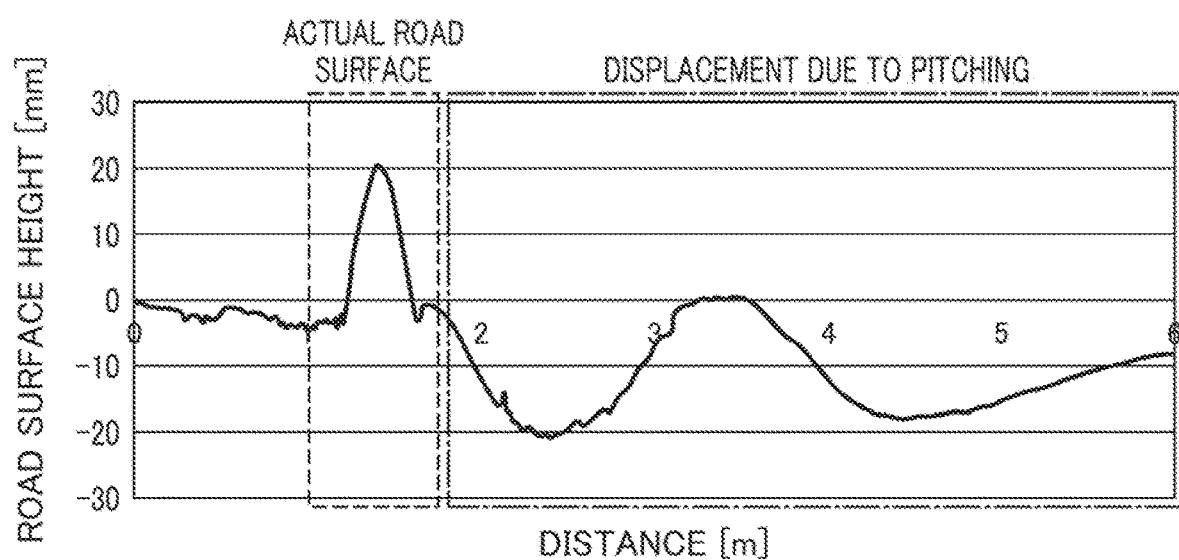
FIG. 19 is a diagram showing a conventional road surface height measurement result when displacement due to pitching occurs in the vehicle body.

FIG. 19 is a diagram showing a conventional road surface height measurement result when displacement due to pitching P occurs in the vehicle body B. Specifically, the road surface height measurement result of FIG. 19 is the conventional road surface height measurement result based on the detection value from one road surface sensor provided on the vehicle body B. In FIG. 19, the horizontal axis represents the distance travelled (m), and the vertical axis represents the road surface height (mm). As shown in FIG. 19, in the conventional road surface height measurement result, the displacement of the vehicle body B due to pitching P when the pitching P occurs in the vehicle body B as well as the actual road surface height is also included in the measurement result.

As described above, since the conventional road surface height measurement based on the detection value from one road surface sensor provided on the vehicle body B provides a measurement result that includes the displacement of the vehicle body B due to the pitching P, it is not possible to acquire the absolute road surface height. Therefore, conventionally, the displacement of the vehicle body B is estimated by integrating the detection value from the acceleration sensor provided on the vehicle body B twice, and the road surface height measurement value is corrected using the estimation value. However, the drift occurring in the integral waveform fluctuates due to the effects of temperature, the weight of occupants, and the distortion that occurs in the vehicle body B. As a result, the estimation accuracy of the displacement of the vehicle body B is poor, and it is practically not possible to acquire an accurate road surface height.

Therefore, in the present embodiment, two road surface sensors are provided at different positions of the vehicle body portion ahead of the front wheel $F_w$ in the front-rear direction of the vehicle V to detect the same road surface twice and calculate the displacement of the vehicle body B and the road surface height based on the difference between the detection values and the movement amount of the vehicle V. Thus, according to the present embodiment, the displacement of the vehicle body B can be accurately calculated, and the road surface height can be accurately calculated. The logic for calculating the road surface height by the road surface height calculation unit 34 will be described below with reference to the drawings.

It is assumed that FIG. 1 shows the state of the vehicle V at time t=0. As shown in FIG. 1, a bump S present on the road surface R is positioned in front of the vehicle V. In this case, the detection value $x_{11}(0)$ from the first road surface sensor 11 and the detection value $x_{12}(0)$ from the second road surface sensor 12 at time t=0 can be represented by Formulas (1) and (2) below using the displacement $x_b(0)$ of the vehicle body B and the road surface height $x_r(0)$ at time t=0.

[Math. 1]

$$x_{11}(0)=x_b(0)-x_r(0) \quad \text{Formula (1)}$$

[Math. 2]

$$x_{12}(0)=x_b(0)-x_r(0) \quad \text{Formula (2)}$$

Here, the displacement $x_b(0)$ of the vehicle body B and the road surface height $x_r(0)$ at time t=0, that is, in the initial state of the vehicle V, are represented by Formulas (3) and (4) below.

[Math. 3]

$$x_b(0)=0 \quad \text{Formula (3)}$$

[Math. 4]

$$x_r(0)=\text{Initial road surface value} \quad \text{Formula (4)}$$

Figure 3:
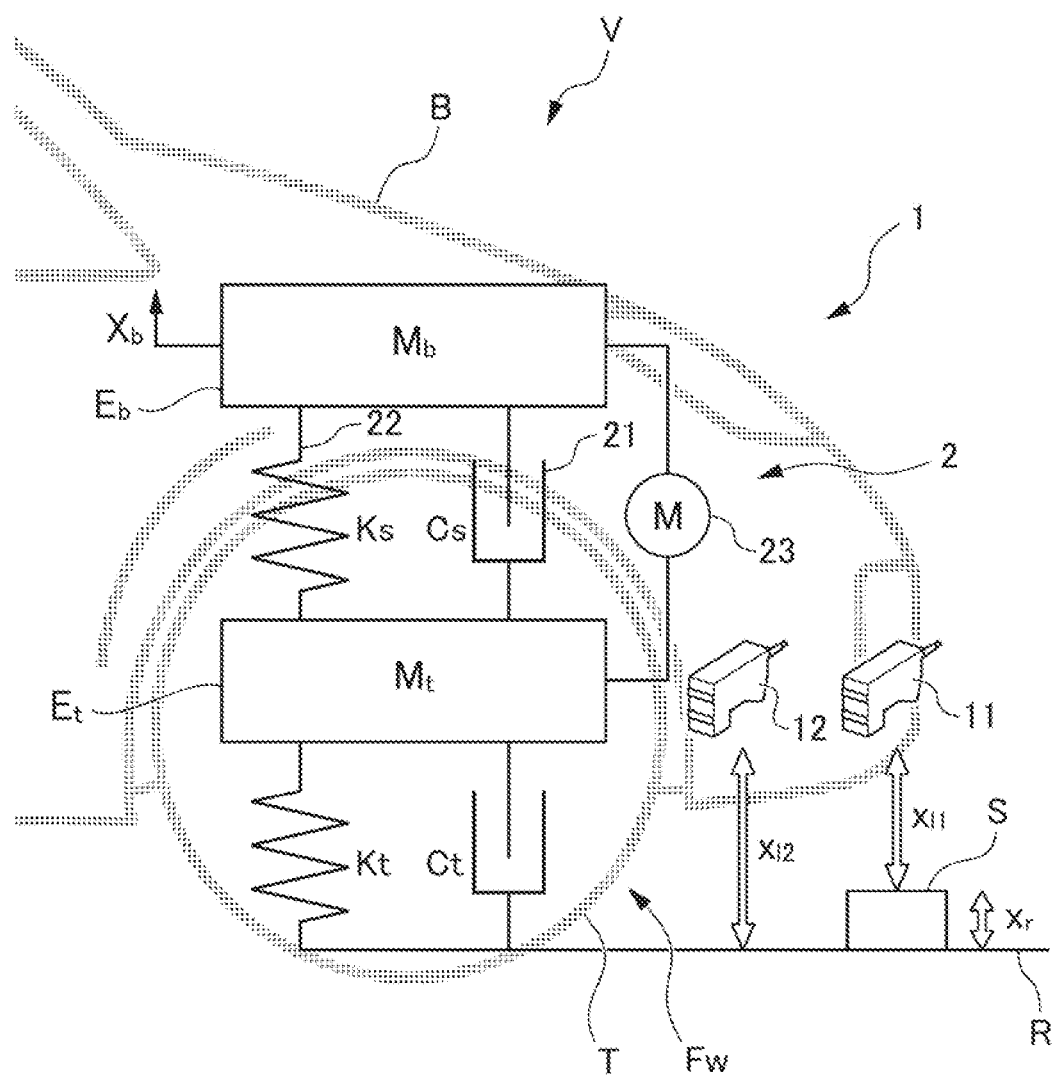
FIG. 3 is a diagram showing a state when a bump on a road surface is positioned below a first road surface sensor.

FIG. 3 is a diagram showing a state when the bump S on the road surface R is positioned below the first road surface sensor 11. It is assumed that FIG. 3 shows the state of the vehicle V at time t=1. Further, it is assumed that the vehicle V has traveled straight ahead between time t=0 and time t=1 until the bump S is positioned below, specifically, directly below, the first road surface sensor 11. That is, the movement amount of the vehicle V in the traveling direction from time t=0 to time t=1 corresponds to the distance between the first road surface sensor 11 and the second road surface sensor 12 in the front-rear direction of the vehicle.

The detection value $x_{11}(1)$ from the first road surface sensor 11 and the detection value $x_{12}(1)$ from the second road surface sensor 12 at time t=1 can be represented by Formulas (5) and (6) below using the displacement $x_b(1)$ of the vehicle body B and the road surface height $x_r(1)$ at time t=1.

[Math. 5]

$$x_{11}(1)=x_b(1)-x_r(1) \quad \text{Formula (5)}$$

[Math. 6]

$$x_{12}(1)=x_b(1)-x_r(1) \quad \text{Formula (6)}$$

Here, the detection value $x_{12}(1)$ from the second road surface sensor 12 at time t=1 can be represented by Formula (7) below since it is the same value as the detection value $x_{11}(0)$ from the first road surface sensor 11 at time t=0.

[Math. 7]

$$x_{12}(1)=x_b(1)-x_r(0) \quad \text{Formula (7)}$$

Then, by transposing Formulas (5) and (7), the displacement of the vehicle body B and the road surface height $x_r(1)$ at time t=1 can be calculated as Formulas (8) to (10) below using the road surface height $x_r(0)$ at time t=0.

[Math. 8]

$$x_b(1)=x_{12}(1)+x_r(0) \quad \text{Formula (8)}$$

[Math. 9]

$$x_r(1)=x_b(1)-x_{11}(1) \quad \text{Formula (9)}$$

[Math. 10]

$$x_r(1)=x_{12}(1)-x_{11}(1)+x_r(0) \quad \text{Formula (10)}$$

Figure 4:
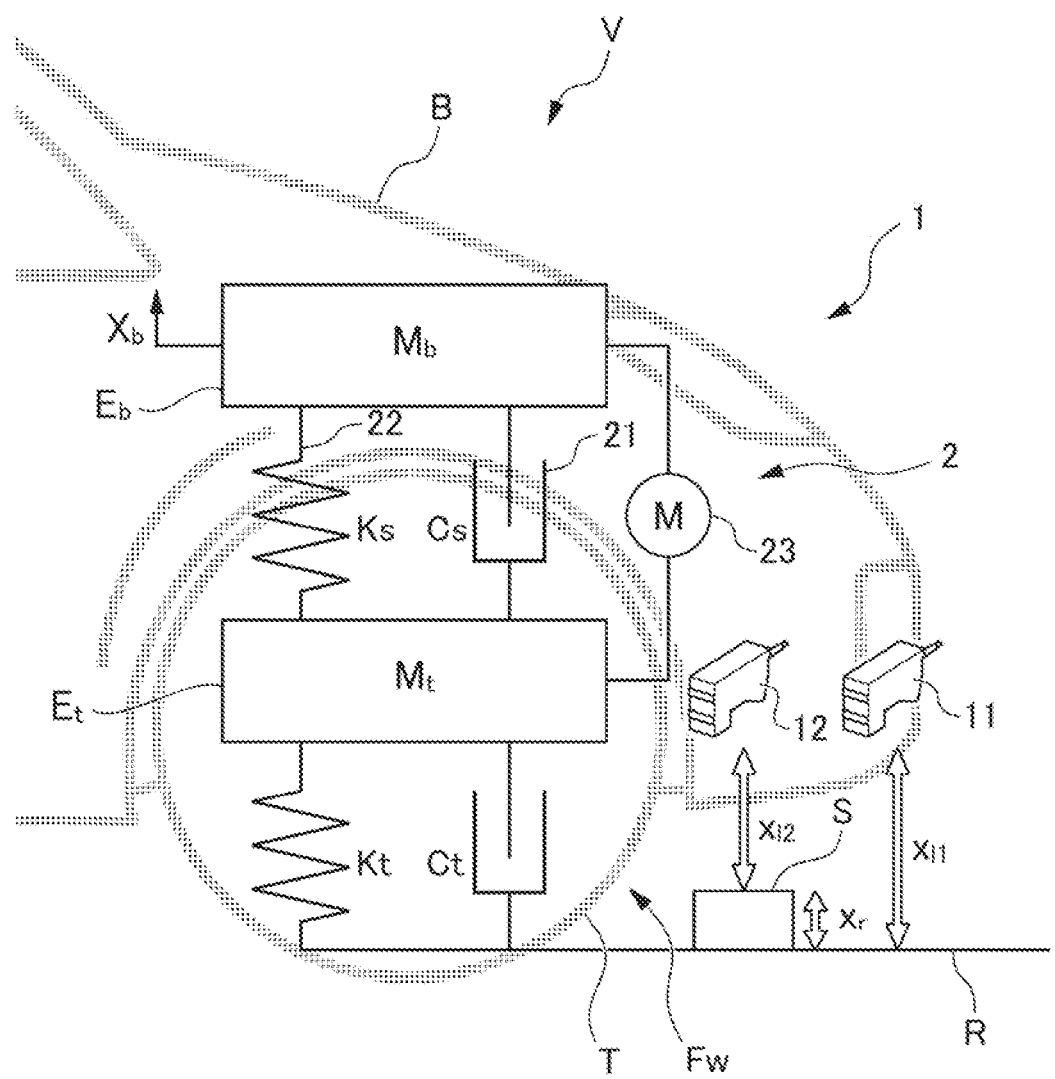
FIG. 4 is a diagram showing a state when a bump on the road surface is positioned below a second road surface sensor.

FIG. 4 is a diagram showing a state when the bump S on the road surface R is positioned below the second road surface sensor 12. It is assumed that FIG. 4 shows the state of the vehicle V at time t=2. In addition, it is assumed that the vehicle V has further travelled straight ahead between time t=1 and time t=2 until the bump S is positioned below, specifically, directly below the second road surface sensor 12. That is, the movement amount of the vehicle V in the traveling direction from time t=1 to time t=2 corresponds to the distance between the first road surface sensor 11 and the second road surface sensor 12 in the front-rear direction of the vehicle.

The detection value $x_{11}(2)$ from the first road surface sensor 11 and the detection value $x_{12}(2)$ from the second road surface sensor 12 at time t=2 can be represented by Formulas (11) and (12) below using the displacement $x_b(2)$ of the vehicle body B and the road surface height $x_r(2)$ at time t=2.

[Math. 11]

$$x_{11}(2)=x_b(2)-x_r(2) \quad \text{Formula (11)}$$

[Math. 12]

$$x_{12}(2)=x_b(2)-x_r(2) \quad \text{Formula (12)}$$

Here, the detection value $x_{12}(2)$ from the second road surface sensor 12 at time t=2 can be represented by Formula (13) below since it is the same value as the detection value $x_{11}(1)$ from the first road surface sensor 11 at time t=1.

[Math. 13]

$$x_{12}(2)=x_b(2)-x_r(1) \quad \text{Formula (13)}$$

Then, by transposing Formulas (11) and (13) and using the road surface height $x_r(1)$ at time t=1 represented by Formula (10), the displacement $x_b(2)$ of the vehicle body B and the road surface height $x_r(2)$ at time t=2 can be calculated as Formulas (14) to (16).

[Math. 14]

$$x_b(2)=x_{12}(2)+x_r(1) \quad \text{Formula (14)}$$

[Math. 15]

$$x_r(2)=x_b(2)-x_{11}(2) \quad \text{Formula (15)}$$

[Math. 16]

$$x_r(2)=x_{12}(1)+x_{12}(2)-x_{11}(1)-x_{11}(2)+x_r(0) \quad \text{Formula (16)}$$

Therefore, by repeating the derivation at each time, the road surface height $x_r(t)$ at time t can be calculated by Formula (17) below. As represented by Formula (17), it can be seen that the road surface height $x_r(t)$ is calculated by adding the difference between the detection value from the first road surface sensor 11 and the detection value from the second road surface sensor 12 to the initial road surface value. Formula (17) includes the difference between the detection value from the first road surface sensor 11 and the detection value from the second road surface sensor 12, so that the vibration of the vehicle body B included in the detection values from the road surface sensors is subtracted, the absolute road surface height is acquired. As described above, conventionally, the displacement of the vehicle body B is estimated by integrating the detection value from the acceleration sensor twice, and the road surface height measurement value is corrected using the estimation value. In contrast, in the present embodiment, the road surface height $x_r(t)$ can be calculated by one integration of adding the difference between the detection value from the first road surface sensor 11 and the detection value from the second road surface sensor 12. Therefore, according to the present embodiment, it is possible to calculate the road surface height x$_r$(t) more accurately and precisely.

[Math. 17]

$$x_r(t) = \sum_{n=0}^{t}(x_{t2}(n) - x_{t1}(n)) + \text{INITIAL ROAD SURFACE VALUE} \quad \text{Formula (17)}$$

In addition, in the calculation of the road surface height x$_r$(t) according to the present embodiment described above, the movement amount of the vehicle V in the traveling direction between time t=0 and time t=1 and between time t=1 and time t=2 is assumed to correspond to the distance between the first road surface sensor 11 and the second road surface sensor 12 in the front-rear direction of the vehicle. Therefore, in the calculation of the road surface height x$_r$(t) according to the present embodiment described above, it is important to calculate the timing for the second road surface sensor 12 to detect the road surface detected by the first road surface sensor 11 based on the movement amount of the vehicle V in the traveling direction and set the time t according to the calculation result. Thus, according to the present embodiment, the road surface height can be calculated based on the detection values from the road surface sensors and the movement amount of the vehicle V in the traveling direction.

Figure 5:
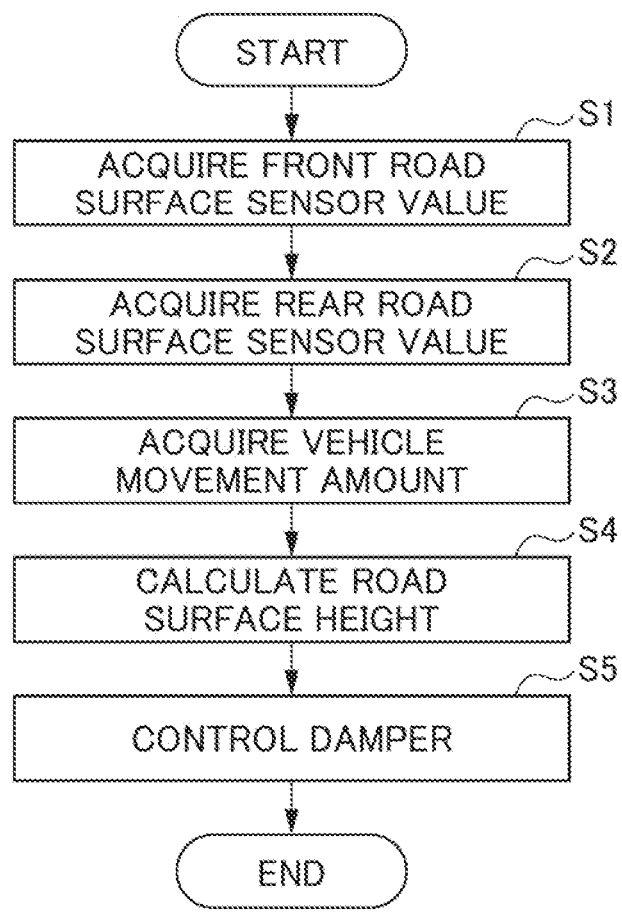
FIG. 5 is a flowchart showing a processing procedure of an ECU included in the vehicle suspension system according to the embodiment.

The ECU 3 executes the road surface height calculation process described above. FIG. 5 is a flowchart showing a processing procedure of the ECU 3 included in the suspension system 1 of the vehicle V according to the present embodiment. The ECU 3 repeatedly executes the processing shown in FIG. 5 at a predetermined cycle.

In step S1, a front road surface sensor value is acquired. Specifically, the front road surface sensor value acquisition unit 31 acquires the detection value from the first road surface sensor 11. After that, the process proceeds to step S2.

In step S2, a front road surface sensor value is acquired. Specifically, the rear road surface sensor value acquisition unit 32 acquires the detection value from the second road surface sensor 12. After that, the process proceeds to step S3.

In step S3, the vehicle movement amount is acquired. Specifically, the vehicle movement amount acquisition unit 33 acquires the movement amount of the vehicle V in the traveling direction. After that, the process proceeds to step S4.

In step S4, the road surface height is calculated. Specifically, the road surface height calculation unit 34 calculates the road surface height by the above-described calculation logic based on the detection value from the first road surface sensor 11 acquired by the front road surface sensor value acquisition unit 31, the detection value from the second road surface sensor 12 acquired by the rear road surface sensor value acquisition unit 32, and the movement amount of the vehicle V in the traveling direction acquired by the vehicle movement amount acquisition unit 33. After that, the process proceeds to step S5.

In step S5, the electromagnetic damper 2 is controlled. Specifically, the damper control unit 35 controls the motor element 23 of the electromagnetic damper 2 based on the road surface height calculated in step S4. In this way, this processing ends.

According to the present embodiment, the following effects are obtained. According to the suspension system 1 of the vehicle V according to the present embodiment, the road surface height is calculated based on the detection value from the first road surface sensor 11 as the front road surface sensor, the detection value from the second road surface sensor 12 as the rear road surface sensor, and the movement amount of the vehicle V in the traveling direction. Thus, the road surface height can be calculated accurately and precisely by subtracting the vibration of the vehicle body B included in the detection values from the road surface sensors. In addition, since the motor element 23 of the electromagnetic damper 2 can be controlled based on the road surface height calculated accurately and precisely, the ride comfort of the vehicle V can be further improved.

Next, a modification of the embodiment will be described. In the embodiment described above, two road surface sensors are provided at different positions in the front-rear direction of the vehicle V to detect the same road surface twice, and the displacement of the vehicle body B and the road surface height are calculated based on the difference between the detection values and the movement amount of the vehicle V. However, this configuration is effective when the vehicle V is traveling straight ahead. On the other hand, when the vehicle V turns, for example, there is a possibility that two different road surface sensors on the front and rear sides of the vehicle V do not pass through the same road surface. Thus, there is room for improvement in calculating the road surface height accurately and precisely.

Figure 6:
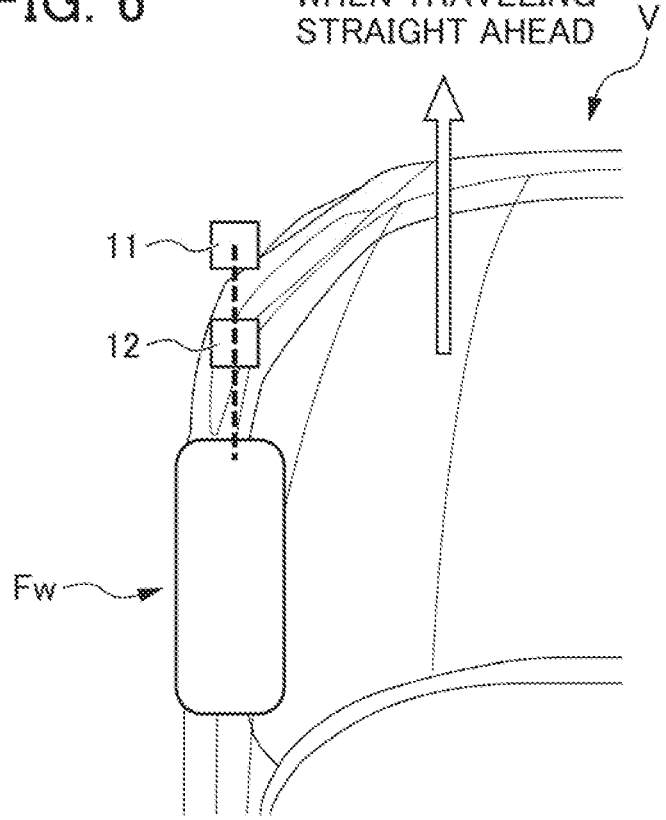
FIG. 6 is a plan view of the vehicle according to the embodiment when traveling straight ahead.

Here, FIG. 6 is a plan view of the vehicle V according to the embodiment when traveling straight ahead. As shown in FIG. 6, it can be seen that, when the vehicle V is traveling straight ahead, the passing position of the first road surface sensor 11 as the front road surface sensor and the passing position of the second road surface sensor 12 as the rear road surface sensor are on the same road surface.

Figure 7:
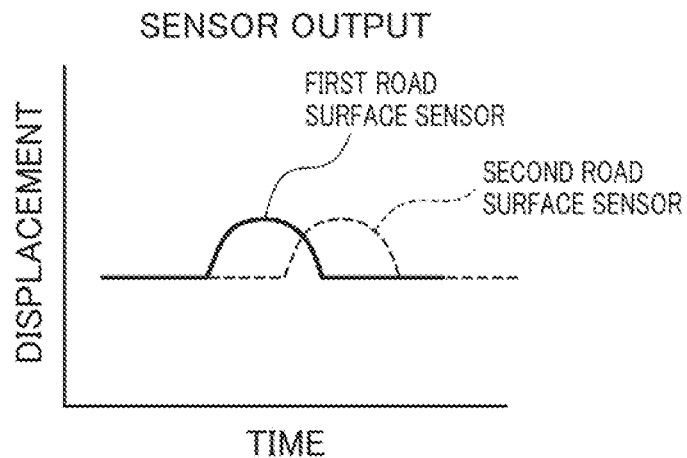
FIG. 7 is a diagram showing detection values from a first road surface sensor and a second road surface sensor when traveling at a constant speed without acceleration/deceleration and turning.
Figure 8:
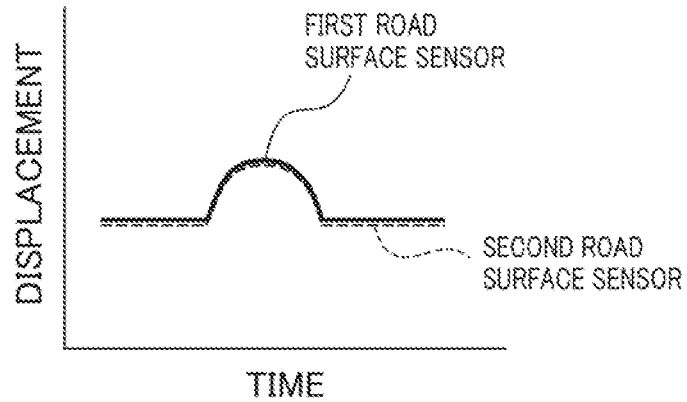
FIG. 8 is a diagram in which the time axes of the detection values from the road surface sensors in FIG. 7 are aligned.

FIG. 7 is a diagram showing detection values from the first road surface sensor 11 and second road surface sensor 12 when traveling at a constant speed without acceleration/deceleration and turning. FIG. 8 is a diagram in which the time axes of the detection values from the road surface sensors in FIG. 7 are aligned. As shown in FIGS. 7 and 8, it can be seen that, when traveling at a constant speed without acceleration/deceleration and turning, the detection value from the first road surface sensor 11 and the detection value from the second road surface sensor 12 are shifted in detection times only, and the detection values overlap each other substantially in the same waveform when the time axes are aligned.

Figure 9:
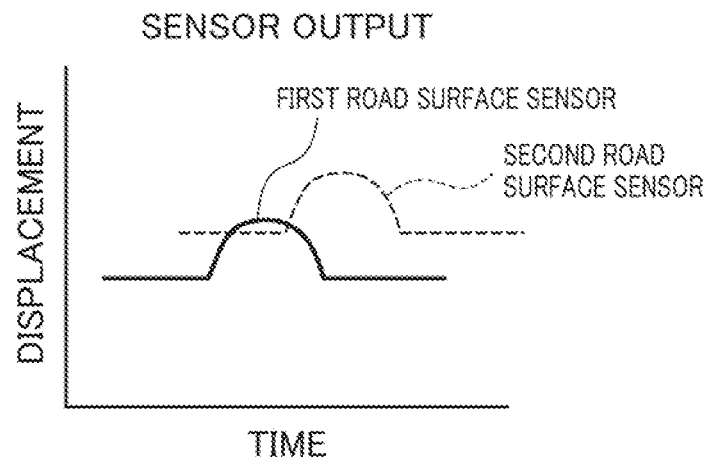
FIG. 9 is a diagram showing the detection values from the first road surface sensor and second road surface sensor during deceleration.
Figure 10:
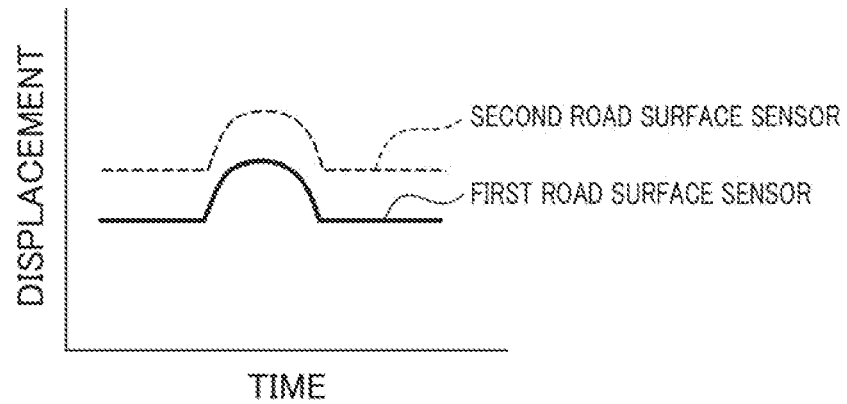
FIG. 10 is a diagram in which the time axes of the detection values from the road surface sensors in FIG. 9 are aligned.

FIG. 9 is a diagram showing the detection value from the first road surface sensor 11 and the detection value from the second road surface sensor 12 during deceleration. FIG. 10 is a diagram in which the time axes of the detection values from the road surface sensors in FIG. 9 are aligned. As shown in FIGS. 9 and 10, it can be seen that since during deceleration, the detection value from the first road surface sensor 11 and the detection value from the second road surface sensor 12 are shifted in detection times and the waveforms thereof are different due to the pitching P that occurs in the vehicle V, the waveforms do not overlap each other even when the time axes are aligned. In this respect, as described above, in the above-described embodiment, the road surface height can be calculated accurately and precisely by subtracting the vibration of the vehicle body B included in the detection values from the road surface sensors.

On the other hand, FIG. 11 is a plan view of the vehicle V according to the embodiment during turning. As shown in FIG. 11, it can be seen that, when the vehicle V is turning, the passing position of the first road surface sensor 11 as the front road surface sensor and the passing position of the second road surface sensor 12 as the rear road surface sensor are not on the same road surface.

Therefore, in this modification, a plurality of rear road surface sensors is provided in the vehicle width direction. FIG. 12 is a plan view of the vehicle V according to this modification when traveling straight ahead. As shown in FIG. 12, the rear road surface sensor of this modification includes a second road surface sensor 12 as a rear center road surface sensor, a third road surface sensor 13 as a rear inner road surface sensor, and a fourth road surface sensor 14 as a rear outer road surface sensor.

The second road surface sensor 12 as the rear center road surface sensor is arranged so as to overlap the position of the first road surface sensor 11 as the front road surface sensor in the vehicle width direction. Specifically, the centers of the first road surface sensor 11 and the second road surface sensor 12 are on the same straight line in the front-rear direction of the vehicle. This is the same arrangement and configuration as the above-described embodiment.

The third road surface sensor 13 as the rear inner road surface sensor is provided on an inner side of the second road surface sensor 12 as the rear central road surface sensor in the vehicle width direction. A detection signal from the third road surface sensor 13 is transmitted to the rear road surface sensor value acquisition unit 32 described above.

The fourth road surface sensor 14 as the rear outer road surface sensor is provided on an outer side of the second road surface sensor 12 as the rear central road surface sensor in the vehicle width direction. A detection signal from the fourth road surface sensor 14 is transmitted to the rear road surface sensor value acquisition unit 32 described above.

The second road surface sensor 12, the third road surface sensor 13, and the fourth road surface sensor 14 are preferably arranged at regular intervals in the vehicle width direction. However, the present invention is not limited to this, and it is sufficient that these three rear road surface sensors are arranged side by side in the vehicle width direction, and there is no restriction on the distance between them.

Figure 14:
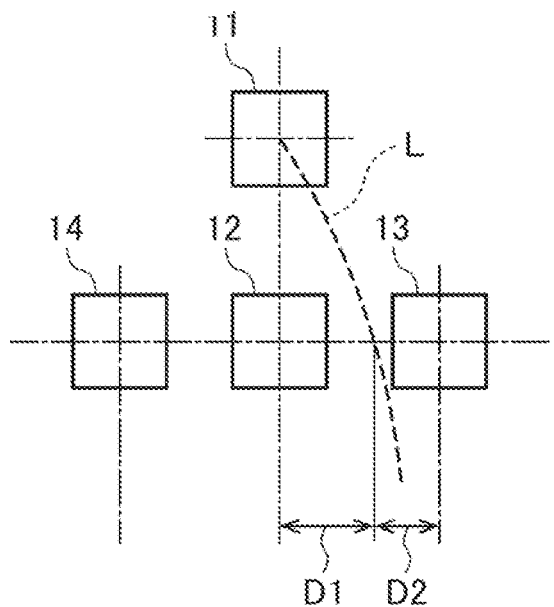
FIG. 14 is a diagram showing the locus of movement of the first road surface sensor during turning.

FIG. 13 is a plan view of the vehicle V according to this modification when turning. FIG. 14 is an enlarged view of the road surface sensor in FIG. 13, showing the locus of movement L of the first road surface sensor 11 during turning. As shown in FIGS. 13 and 14, it can be seen that, when the vehicle V is turning, the passing position of the first road surface sensor 11 as the front road surface sensor does not overlap any one of the three rear road surface sensors (second road surface sensor 12, third road surface sensor 13, and fourth road surface sensor 14). That is, it can be seen that none of the three rear road surface sensors detect the same road surface as that detected by the first road surface sensor 11 as the front road surface sensor.

Therefore, in this modification, the road surface height calculation unit 34 uses the detection values from the three rear road surface sensors to calculate the road surface height at the position where the first road surface sensor 11 as the front road surface sensor has passed between the three rear road surface sensors by interpolation. Specifically, as indicated by the locus of movement L of the first road surface sensor 11 in FIG. 14, it is assumed that the passing position of the first road surface sensor 11 is between the second road surface sensor 12 and the third road surface sensor 13. In this case, when $x_{12}$ is the detection value from the second road surface sensor 12, $x_{13}$ is the detection value from the third road surface sensor 13, D1 is the distance in the vehicle width direction between the passing position of the first road surface sensor 11 and the center of the second road surface sensor 12, and D2 is the distance in the vehicle width direction between the passing position of the first road surface sensor 11 and the center of the third road surface sensor 13, the detection value x from the rear road surface sensor at the position where the first road surface sensor 11 passes can be estimated by Formula (18) below by interpolation.

[Math. 18]

$$x = x_{12} * D1/(D1+D2) + x_{13} * D2/(D1+D2) \qquad \text{Formula (18)}$$

Figure 15:
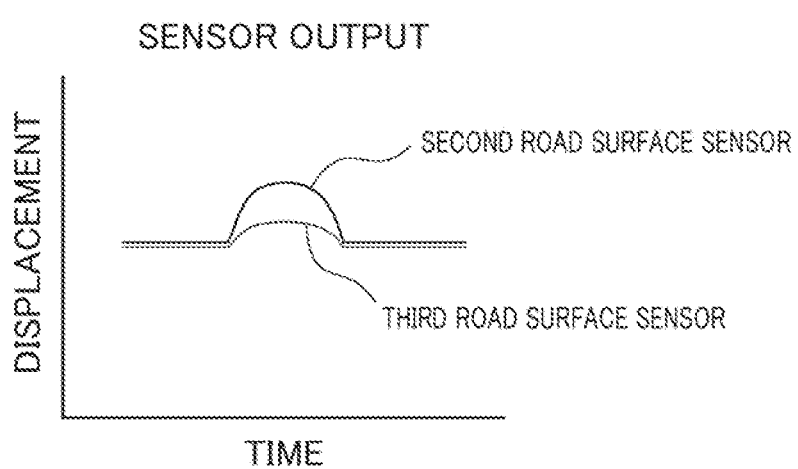
FIG. 15 is a diagram showing the detection values from a second road surface sensor and a third road surface sensor.
Figure 16:
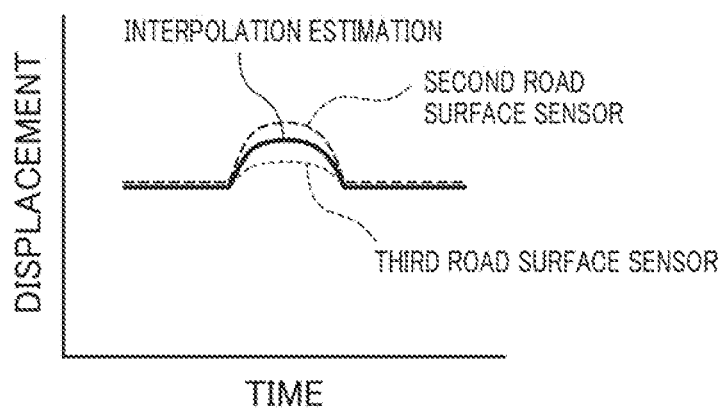
FIG. 16 is a diagram showing an estimation value from a rear road surface sensor at a position where the first road surface sensor passes, estimated by interpolation using the detection values from the second road surface sensor and the third road surface sensor.
Figure 17:
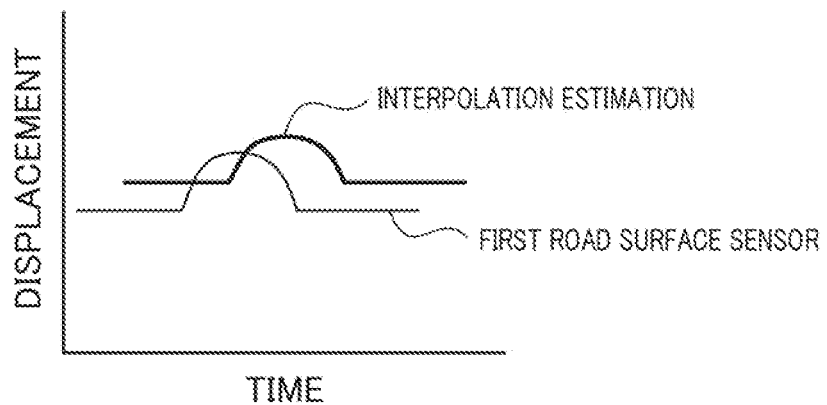
FIG. 17 is a diagram showing an estimation value from a rear road surface sensor at a position through which a first road surface sensor passes, estimated by interpolation, and a detection value from the first road surface sensor.

Here, FIG. 15 is a diagram showing the detection value from the second road surface sensor 12 and the detection value from the third road surface sensor 13, and FIG. 16 is a diagram showing the estimation value from the rear road surface sensor at a position where the first road surface sensor 11 passes, which is estimated by interpolation using the detection value from the second road surface sensor 12 and the detection value from the third road surface sensor 13 as described above. FIG. 17 is a diagram showing the estimation value from the rear road surface sensor at the position where the first road surface sensor 11 passes, which is estimated by interpolation, and the detection value from the first road surface sensor 11. In this way, the road surface height calculation unit 34 calculates the road surface height in the same manner as the above-described embodiment using the detection value from the first road surface sensor 11 as the front road surface sensor and the estimation value from the rear road surface sensor at the position where the first road surface sensor 11 passes, which is estimated by interpolation. Thus, the road surface height can be calculated more accurately and precisely.

It should be noted that the passing position of the first road surface sensor 11 can be estimated, for example, from a steering angle detected by a steering angle sensor (not shown). Alternatively, the passing position of the first road surface sensor 11 can be estimated from the vehicle speed detected by a vehicle speed sensor (not shown).

According to this modification, the rear road surface sensor includes the second road surface sensor 12 as the rear center road surface sensor, the third road surface sensor 13 as the rear inner road surface sensor, and the fourth road surface sensor 14 as the rear outer road surface sensor arranged side by side in the vehicle width direction. Thus, even when the vehicle V is turning, for example, the road surface height at the position where the front road surface sensor (first road surface sensor 11) passes between the plurality of rear road surface sensors can be calculated by interpolation using the detection values from the plurality of rear road surface sensors, and the road surface height can be calculated accurately and precisely.

Note that the present disclosure is not limited to the embodiments, and also includes modifications and improvements within the range where the object of the present disclosure can be achieved.

In the modification of the embodiment, a plurality of rear road surface sensors is provided in the vehicle width direction, but the present invention is not limited to this. For example, a plurality of front road surface sensors may be provided in the vehicle width direction, and both front road surface sensors and rear road surface sensors may be provided plurally in the vehicle width direction.

In the modification of the above-described embodiment, three rear road surface sensors are provided in the vehicle width direction, but the present invention is not limited to this, and three or more rear road surface sensors may be provided. Further, even when a plurality of front road surface sensors is provided in the vehicle width direction, the number is not limited to three, and three or more front road surface sensors may be provided.

EXPLANATION OF REFERENCE NUMERALS

1 Vehicle suspension system
11 First road surface sensor (front road surface sensor)
12 Second road surface sensor (rear road surface sensor, rear central road surface sensor)
13 Third road surface sensor (rear road surface sensor, rear inner road surface sensor)
14 Fourth road surface sensor (rear road surface sensor, rear outer road surface sensor)
2 Electromagnetic damper (damper)
21 Damper element
22 Spring element
23 Motor element (actuator)
3 ECU (control device)
31 Front road surface sensor value acquisition unit
32 Rear road surface sensor value acquisition unit
33 Vehicle movement amount acquisition unit
34 Road surface height calculation unit
35 Damper control unit
V Vehicle
B Vehicle body
$F_w$ Front wheel
T Tire
P Pitching
R Road surface
S Bump
L Locus
$E_b$ Sprung member (vehicle body)
$E_t$ Unsprung member (wheel)
$M_b$ Sprung mass
$M_t$ Unsprung mass
Ks Spring coefficient of spring element
Kt Spring coefficient of tire
Cs Viscous damping coefficient of damper element
Ct Viscous damping coefficient of tire
$x_b$ Vehicle body displacement
$x_{11}$ Front road surface sensor value
$x_{12}$ Rear road surface sensor value
$x_r$ Road surface height

What is claimed is:

1. A vehicle suspension system comprising:
a road surface sensor provided in a portion of a vehicle body ahead of a front wheel to detect an unevenness of a road surface;
a damper provided between the vehicle body, which is a sprung member of a vehicle, and a wheel, which is an unsprung member, to apply a damping force and a propulsive force along a stroke direction to the vehicle body and the wheel with the aid of an actuator; and
a control device that controls the actuator based on a detection value from the road surface sensor, wherein
the road surface sensor comprises:
a front road surface sensor; and
a rear road surface sensor that overlaps the front road surface sensor in a vehicle width direction and is provided at a position behind the front road surface sensor,
the control device comprises:
a vehicle movement amount acquisitioner that acquires a movement amount of the vehicle;
a road surface height calculator that calculates a road surface height based on a detection value from the road surface sensor and the movement amount of the vehicle acquired by the vehicle movement amount acquisitioner; and
a damper controller that controls the actuator based on the road surface height calculated by the road surface height calculator, and
at least one selected from the front road surface sensor and the rear road surface sensor further comprises:
a central road surface sensor that overlaps the other road surface sensor in the vehicle width direction;
an inner road surface sensor provided on an inner side of the central road surface sensor in the vehicle width direction; and
an outer road surface sensor provided on an outer side of the central road surface sensor in the vehicle width direction.

2. The vehicle suspension system according to claim 1, wherein
the rear road surface sensor comprises:
a rear center road surface sensor that overlaps the front road surface sensor in the vehicle width direction;
a rear inner road surface sensor provided on an inner side of the rear center road surface sensor in the vehicle width direction; and
a rear outer road surface sensor provided on an outer side of the rear center road surface sensor in the vehicle width direction, and
the road surface height calculator uses detection values from the plurality of rear road surface sensors to calculate a road surface height at a position where the front road surface sensor passes between the plurality of rear road surface sensors by interpolation.

* * * * *